United States Patent [19]

White

[11] Patent Number: 4,947,947
[45] Date of Patent: Aug. 14, 1990

[54] SLIVER MEASURING APPARATUS WITH OVERLOAD RELIEF

[75] Inventor: Homer S. White, Durham, N.C.
[73] Assignee: Myrick-White, Inc., Durham, N.C.
[21] Appl. No.: 441,242
[22] Filed: Nov. 27, 1989
[51] Int. Cl.[5] ............... G01G 23/02; G01G 23/06; G01G 3/14; G01L 5/04
[52] U.S. Cl. ................................. 177/153; 177/187; 177/211; 73/160
[58] Field of Search .............. 177/153, 187, 211; 73/160

[56] References Cited

U.S. PATENT DOCUMENTS 4,823,597 4/1989 White ........................... 73/160

Primary Examiner—George H. Miller, Jr.
Attorney, Agent, or Firm—Olive & Olive

[57] ABSTRACT

An improved measuring device for measuring the unit weight of sliver as it passes through a trumpet includes a trumpet gauge plate for supporting the trumpet and a vibration compensating element mounted on the plate. A plurality of strain gauges for detecting deflections are mounted on front and rear surfaces of a central portion of the plate adjacent a lower portion and the compensating element. The plate is mounted on support means, illustrated as a pair of spring supports, which allow the trumpet to move in response to an overload to eliminate damage to the plate, particularly its central portion where the strain gauges are mounted and to return to its normal position after the overload is gone. During normal operation, without an overload, deflection sensing produced by external vibrations cancel out to produce an accurate measurement of the sliver weight and during an overload, the trumpet moves to a new position to avoid damage to the plate and then returns, after the overload is gone enabling the measuring operation to continue.

11 Claims, 8 Drawing Sheets

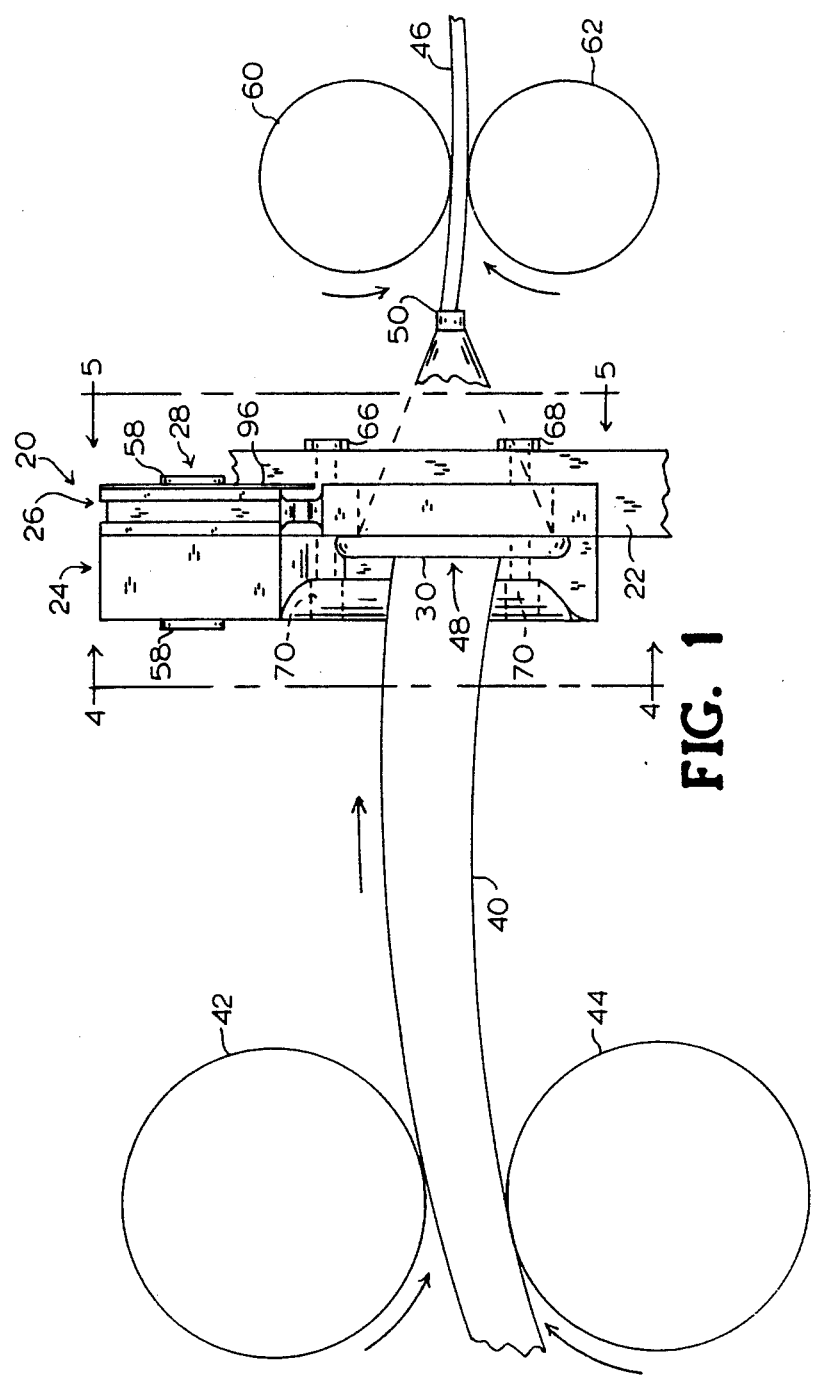

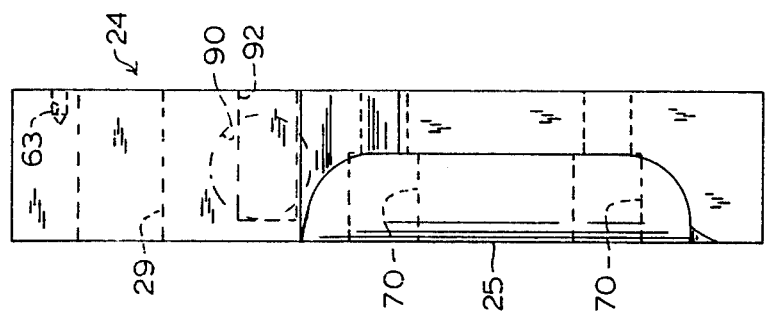
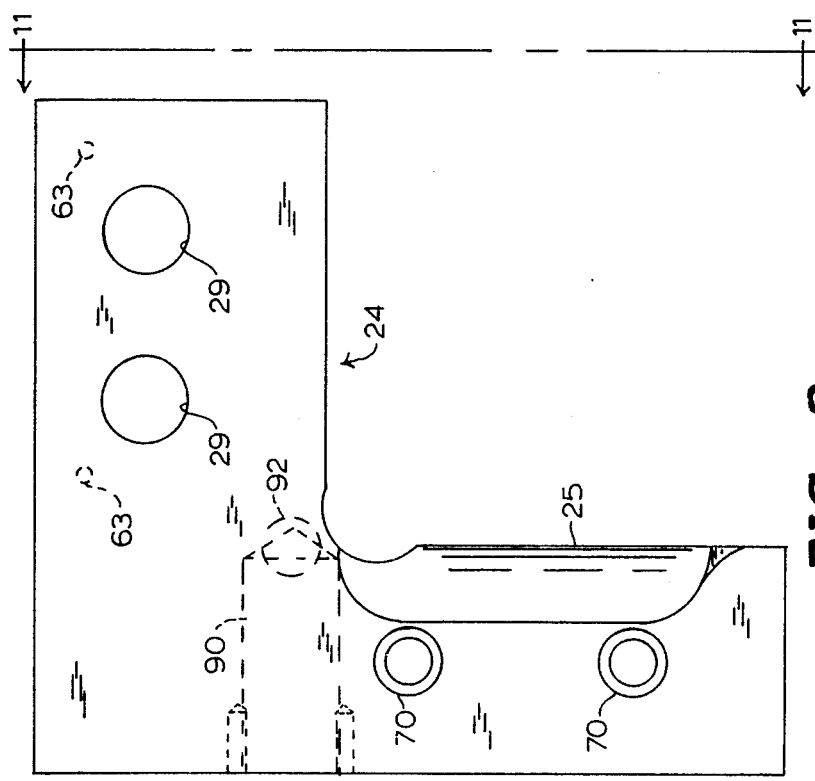

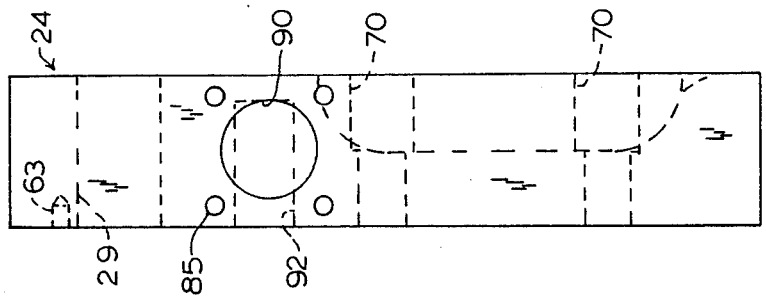
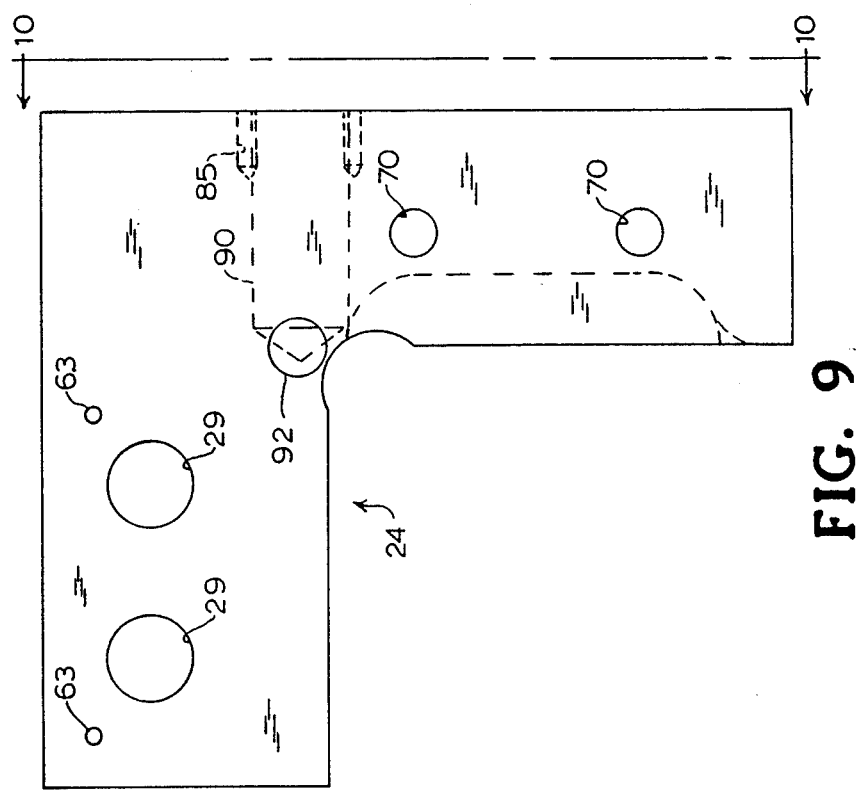
FIG. 10
FIG. 9

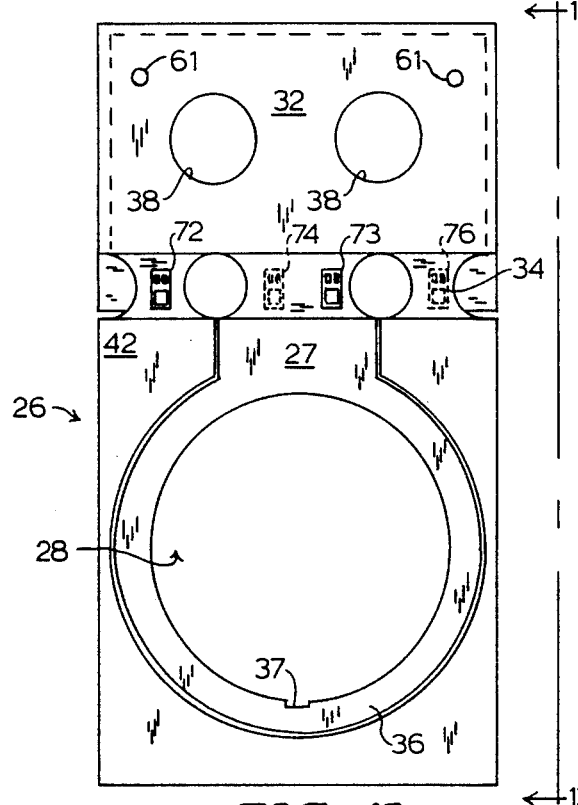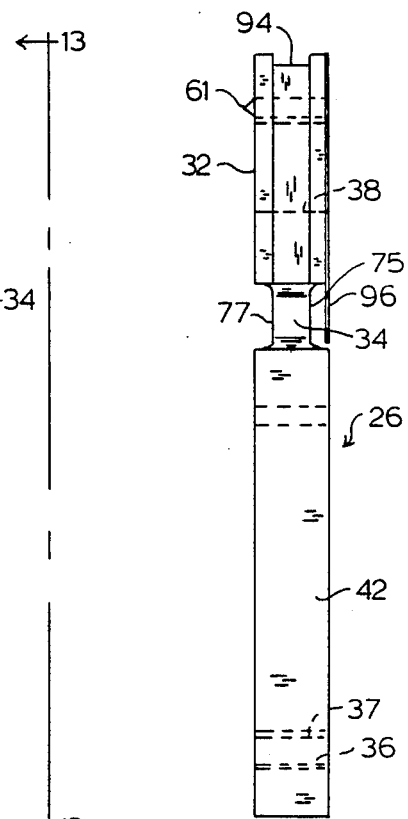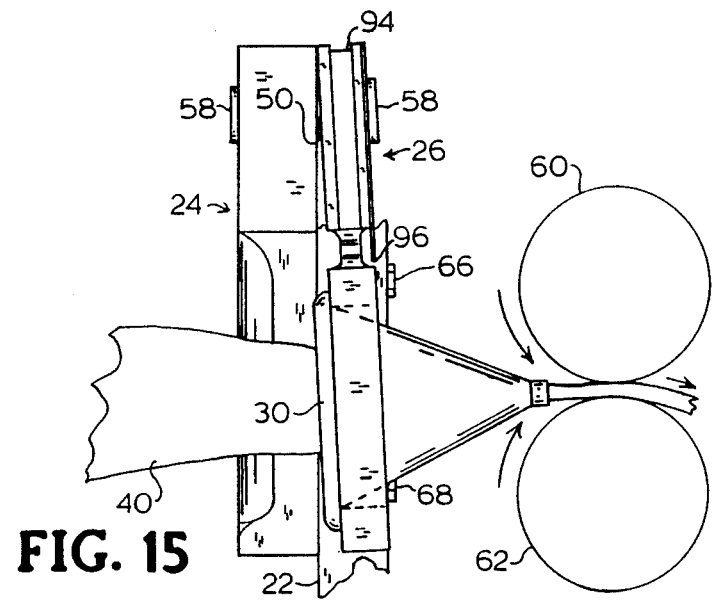
FIG. 12
FIG. 13
FIG. 15

SLIVER MEASURING APPARATUS WITH OVERLOAD RELIEF

BACKGROUND OF THE INVENTION

1. Field of the Invention

The present invention relates generally to measuring devices, and in particular, is concerned with a measuring apparatus for determining the weight of sliver.

2. Description of the Related Art.

In the textile industry, loose, untwisted fibers, such as cotton, worsted or wool, are manipulated during a carding process to form sliver. Sliver is generally coiled into and stored in cans or drums prior to spinning or other processes before being made into yarn.

For a carding process, it is desirable to know the weight per unit length of the sliver. Conventionally, this value has been determined by the use of strain gauges. After carding, the sliver is passed through a funnel, commonly known as a trumpet, which is mounted on and supported by a rigid plate, e.g. a steel plate. Electrically resistive type strain gauges mounted on the plate sense deflections caused by the sliver. The deflection sensings are translated into unit weight measurements by wiring the strain gauges in a Wheatstone Bridge configuration all of which is fully described in applicant's prior U.S. Pat. No. 4,823,597.

A particular problem with the above-described prior art measuring technique is that the plate is subject to external vibrations and other deflections which cause inaccurate measurements. For example, heavy equipment traveling near the measuring apparatus can impart vibrations to the plate which are sensed by the strain gauges and result in erroneous measurements.

Applicant's improved sliver measuring apparatus described in his prior U.S. Pat. No. 4,823,597 provides measurements free of error due to external vibrations and thus represents a significant improvement over the prior art. However, experience gained with the improved sliver measuring apparatus has indicated a further need for preventing damage in the event of an overload. In this regard it is to be noted that a normal load on the trumpet will cause no damage to the trumpet's mounting plate whereas an excess load on the trumpet mounting plate has been found to cause damage particularly to the portion of reduced cross section where the sensors are mounted. In this event the measuring apparatus has to be either repaired or discarded depending on the extent of damage. Other prior art relevant to the invention is described in U.S. Pat. No. 4,823,597.

The present invention thus has as its primary object that of providing a sliver measuring apparatus capable of rendering error free measurements in the event of external vibrations while at the same time also being capable of dealing with transient overloads on the trumpet without causing permanent damage to the trumpet mounting plate. Other objects will appear as the description proceeds.

SUMMARY OF THE INVENTION

An improved measuring device for measuring the unit weight of sliver as it passes through a trumpet includes a trumpet gauge plate for supporting the trumpet and vibration compensating structure on each side of the plate. The plate can be mounted either horizontally or vertically or at some angle suited to the application. The description here assumes the plate is vertically positioned. The plate comprises upper, lower and central portions which may also be regarded as first and second end portions and a central portion. The lower portion provides an opening for supporting the trumpet and the central portion has a reduced cross section. A plurality of electrically resistive type strain gauges for detecting deflections are mounted on front and rear surfaces of the central portion adjacent the lower portion and the weighted elements. The strain gauges are electrically connected in a Wheatstone Bridge configuration. Deflection sensings in strain gauges adjacent the vibration compensating structure cancel out deflection sensings produced by external vibrations to produce an accurate measurement of the sliver weight.

Of particular interest to the present invention is the means for responding to an overload on the trumpet. In this regard the upper portion of the trumpet gauge plate is illustrated as being spring mounted on a bracket which in turn is rigidly secured to a fixed frame member. Thus, in the event of an overload e.g. in excess of a five pound force on the trumpet, the trumpet gauge plate is able to pivot on its supporting bracket and thus avoid any permanent damage particularly to the central portion of reduced cross section. In the normal operation with a normal load on the trumpet deflection sensings produced by external vibrations continue to be cancelled out to produce an accurate measurement of the sliver weight. However, an overload can now be accommodated without damage to the trumpet mounting plate.

BRIEF DESCRIPTION OF THE DRAWINGS

FIG. 1 is a schematic view of a sliver measuring apparatus illustrating a trumpet mounted on a spring loaded trumpet gauge plate as sliver is drawn through the trumpet according to the present invention but with the strain gauges and connected wiring eliminated for purposes of simplifying the illustration.

FIG. 8 is a front view of the trumpet gauge support bracket removed from the assembly of FIG. 7.

FIG. 9 is a rear view of the trumpet gauge support bracket.

FIG. 10 is a top view of the trumpet gauge support bracket taken in the direction of line 10—10 of FIG. 9.

FIG. 11 is a side view of the trumpet gauge support bracket taken in the direction of line 11—11 of FIG. 8.

FIG. 12 is a front view of the trumpet gauge plate removed from the assembly of FIG. 7 with the strain gauges arranged corresponding to the first embodiment configuration of FIG. 2 with the strain gauge wiring and strain gauge cover plate eliminated for purposes of illustration.

FIG. 13 is a side view of the trumpet gauge plate taken in the direction of line 13—13 of FIG. 12.

FIG. 15 is a side view of the trumpet gauge plate in a tilted position on its support bracket simulating a response to an overload condition.

DETAILED DESCRIPTION OF THE PREFERRED EMBODIMENTS

U.S. Pat. No. 4,823,597 describes the construction and operation of both a conventional trumpet gauge plate and the improved trumpet gauge plate which provides error free measurements in the presence of external vibrations. Reference may be made to the patent for such description. The present invention as set forth in the description to follow preserves the advantages of the improved trumpet gauge plate of the patent while providing the significantly important additional feature of being able to respond to an overload to prevent permanent damage to the trumpet gauge plate.

Figure 14:
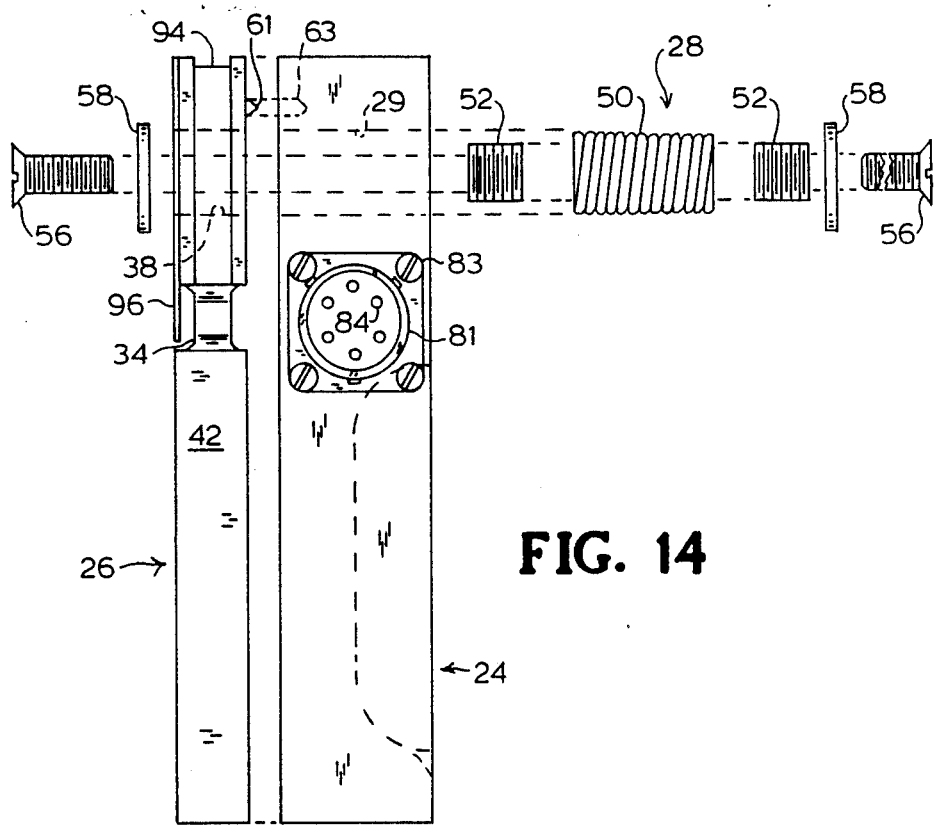
FIG. 14 is a side view of the trumpet gauge plate-bracket assembly like FIG. 7 but with the plate spring mounting components shown in an exploded view for illustration.

Making reference to the drawings and particularly to FIG. 1, the trumpet gauge plate-bracket-strain gauge assembly 20 of the invention is shown in FIG. 1 secured to a frame member 22. Assembly 20 primarily comprises an L-shaped bracket 24 (FIG. 8), the trumpet gauge plate 26 secured to bracket 24 by spring assemblies 28 (FIG. 14), the trumpet 30 and a group of strain gauges, shown in a first embodiment in FIGS. 2 and 12, in a second embodiment in FIG. 3, and appropriate wiring, not shown. As later explained, the strain-gauges may, for example, be four (FIG. 2) or eight (FIG. 3) in number and arranged in the Wheatstone Bridge configuration of either FIG. 2 or FIG. 3. Other configurations suited to the invention may be employed.

Textile material in the form of a thin planar web 40 (FIG. 1) is removed from the doffer roll (not shown) by doffer take-off rolls 42, 44. The web is condensed into a circular form 46 known as sliver as it is drawn through the mouth 48 and outlet 50 of trumpet 30 by calendar rolls 60, 62. Bracket 24 is mounted on and supported by a frame member or base 22, e.g. a carding machine frame, by mechanical fasteners 66, 68 passing through mounting openings or holes 70 in the lower leg portion 25 (FIG. 8) of bracket 24.

Figure 7:
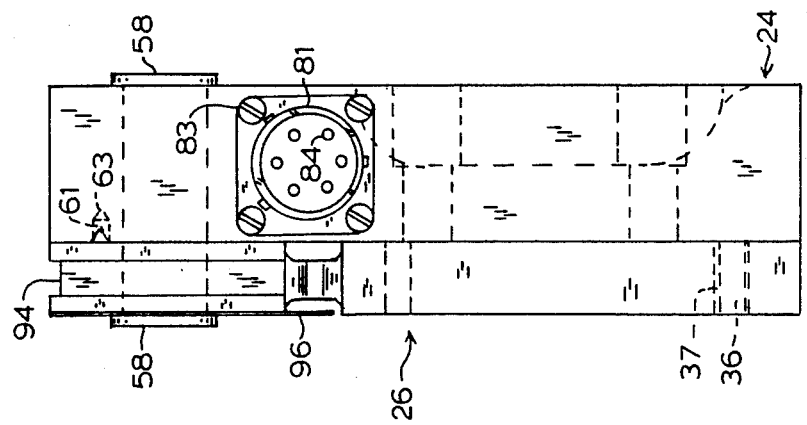
FIG. 7 is a side view of the trumpet gauge plate-bracket assembly of the invention taken in the direction of line 7—7 of FIG. 4.
Figure 5:
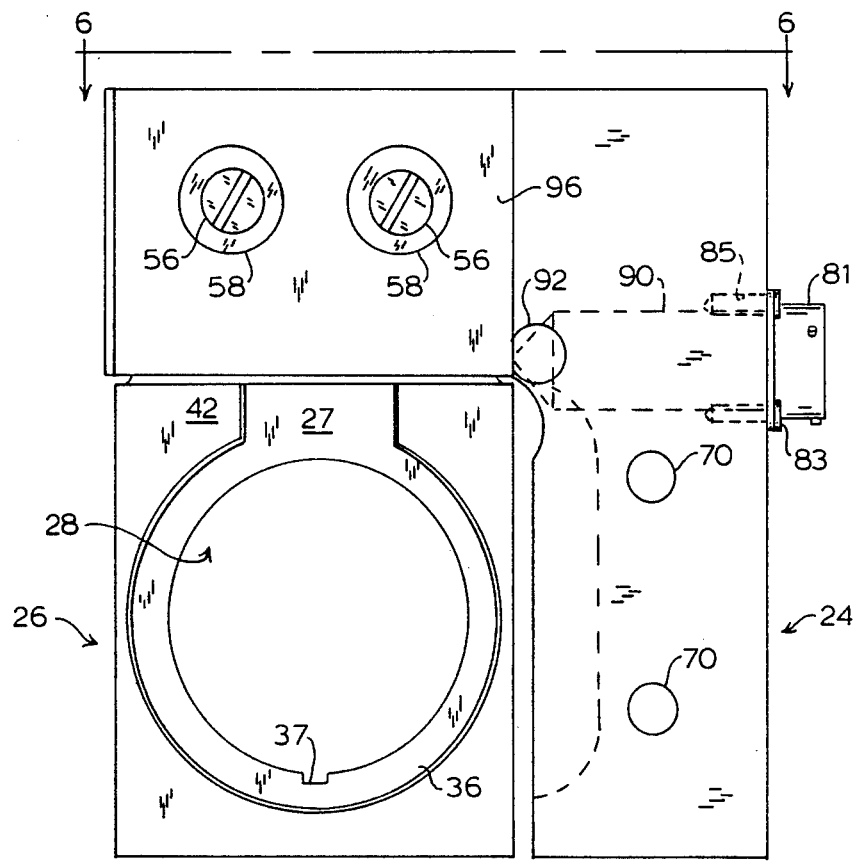
FIG. 5 is a rear elevational view of the trumpet gauge plate-bracket assembly of the invention taken in the direction of line 5—5 of FIG. 1.
Figure 6:
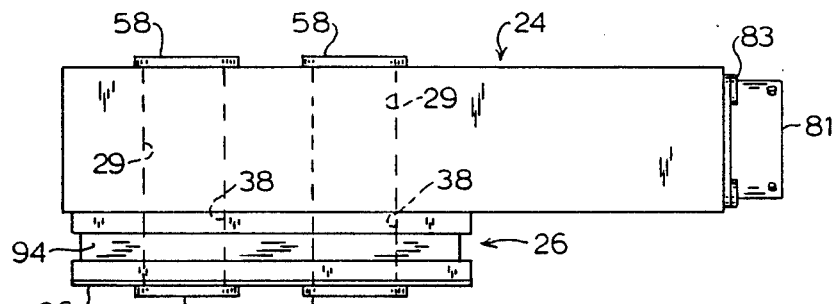
FIG. 6 is a top view of the trumpet gauge plate-bracket assembly of the invention taken in the direction of line 6—6 of FIG. 5.

Bracket 24 best illustrated in FIGS. 8-11 is of an L-shape as previously mentioned. A wiring socket 81 retained by screws 83 in screw holes 85 and having appropriate pins 84 (FIG. 14) connected to the strain gauge wiring, not shown, mounts on bracket 24 as seen for example in FIGS. 5 and 7. The strain gauge wiring connected to socket 81 is passed through the socket passage 90 and hole 92 and is wrapped in the groove 94 of gauge plate 26. A cover plate 96 is secured to protect the strain gauges. Having described bracket 24, the description next refers to details of the trumpet gauge plate 26.

Figure 4:
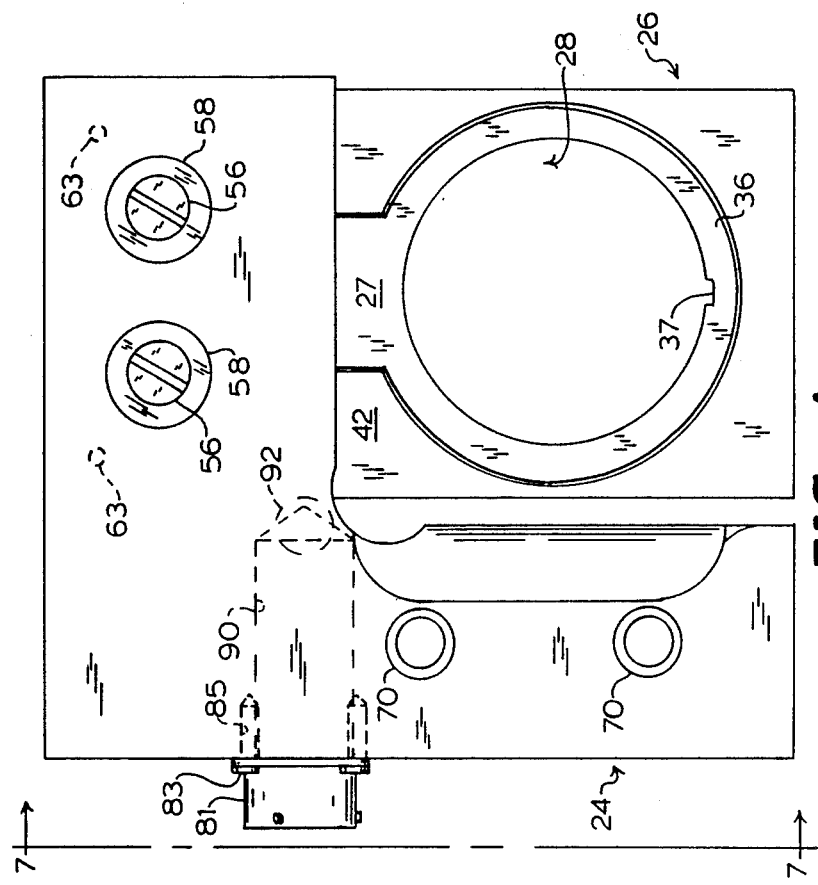
FIG. 4 is an elevational view of the trumpet gauge plate-bracket assembly of the invention taken in the direction of line 4—4 of FIG. 1.

Trumpet gauge plate 26 includes a lower portion 27 having within an annular portion 36 a central opening 28 (FIG. 4) for receiving the trumpet 30 in the manner of the assembly illustrated in FIG. 1. For the type of trumpet having a registration rib there is provided a mating registration slot 37 (FIG. 4).

Plate 26 further includes an upper portion 32 (FIG. 12) and a central portion 34 to which is appended the lower portion 27 including annular portion 36. As illustrated best in FIG. 13, central portion 34 has a cross section less than the cross sections of upper portion 32 and lower portion 36. Upper portion 32 includes openings 38 for receiving a pair of spring assemblies 28 (FIG. 14) which provide a spring loaded securement of trumpet mounting plate 26 to support bracket 24 and enable gauge plate 26 and its mounted trumpet 30 to tilt in the presence of an overload as best illustrated in FIG. 15 thus avoiding bending of the critical central portion 34 on which the strain gauges are mounted. Bracket 24 includes a pair of holes 29 which also receive the spring assemblies 28.

Each spring assembly 28 (FIG. 14) comprises a coil spring 50 within each end of which an externally threaded collar 52 is threadly mounted. The pair of collars 52 are also internally threaded and receive a pair of screws 56 which pass through and seat in respective washers 58. Thus, by tightening screws 56 coil spring 50 is placed under some predetermined tension to resiliently secure gauge plate 26 to support bracket 24. A pair of pointed pins 61 on gauge plate 26 are received by holes 63 in bracket 24 and maintain proper alignment. A typical overload would be that imposing a force in excess of five pounds on trumpet 30.

A vibration compensating element 42 of appropriate weight surrounds lower portion 36 and is appended to central portion 34. Element 42 is formed to be operationally equivalent to lower portion 27 and to be equal in weight to the weight of lower portion 27 including its annular portion 36. Element 42 acts as a vibration compensating element that provides an equal force and displacement to that produced by lower portion 27 and which are sensed by the plurality of strain gauges mounted on central portion 34. Element 42 is able to vibrate independent of the vibration of lower portion 27 including its appended annular portion 36 supporting trumpet 30. Element 42 effectively provides a mass and frequency substantially equal to that of lower portion 27 including its annular portion 36.

Figure 2:
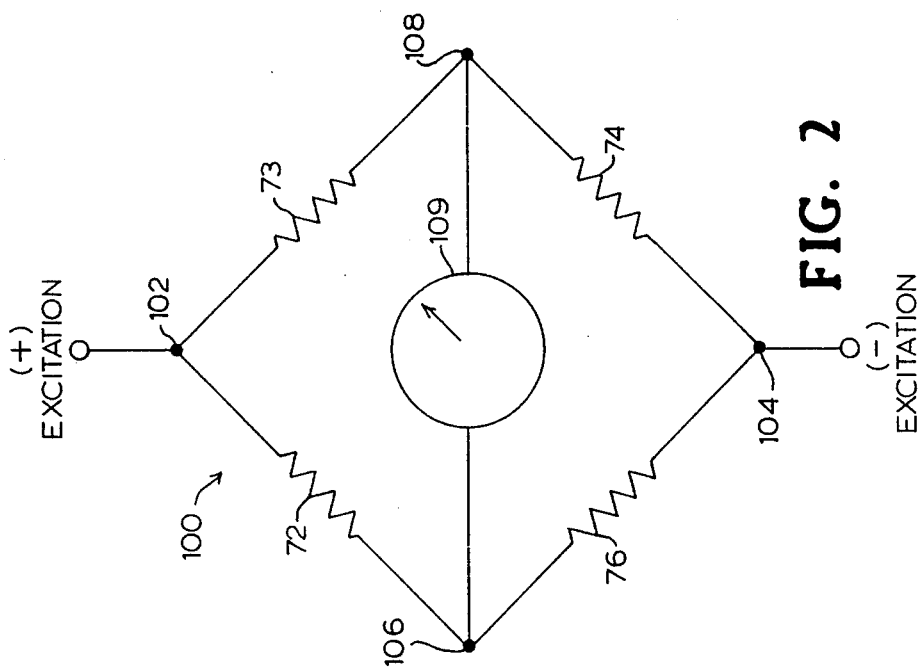
FIG. 2 is a schematic view of four strain gauges connected in a Wheatstone Bridge configuration according to a first embodiment of the invention.

In the first embodiment corresponding to FIG. 2, strain gauges 72 and 73 are mounted on the front surface 75 (FIG. 13) of central portion 34. Strain gauge 72 is mounted above the left side of element 42 as viewed in FIG. 12 and strain gauge 73 is mounted above the right half of lower portion 27 as viewed in FIG. 12. Strain gauges 74 and 76 (FIG. 12) are mounted at the respective positions shown in FIG. 12 on the rear surface 77 (FIG. 13) of central portion 34. Strain gauge 74 resides above the left half of lower portion 27 whereas strain gauge 76 resides above the right side of element 42 as viewed in FIG. 12.

In the embodiment of bridge 100 illustrated in FIG. 2, strain gauge 72, on front surface 75 above the left half of element 42, and strain gauge 76, on the back surface 77 above the right half of element 42, are electrically connected between nodes 102 and 104 through node 106. Strain gauge 74 on rear surface 77 above the left half of lower portion 27, and strain gauge 73 on front surface 75 above the right half of lower portion 27, are electrically connected between nodes 102 and 104 through node 108. The strain is indicated by an appropriate voltage indicator 109.

The electrical polarity of each gauge in each pair of strain gauges in each leg of bridge 100 is arranged such that the voltages produced in the leg by vibration as the central portion 34 is deflected tend to cancel each other out. The remaining voltage in each leg is thus an accurate indication of the deflection of the central portion 34 due to trumpet deflection only.

Figure 3:
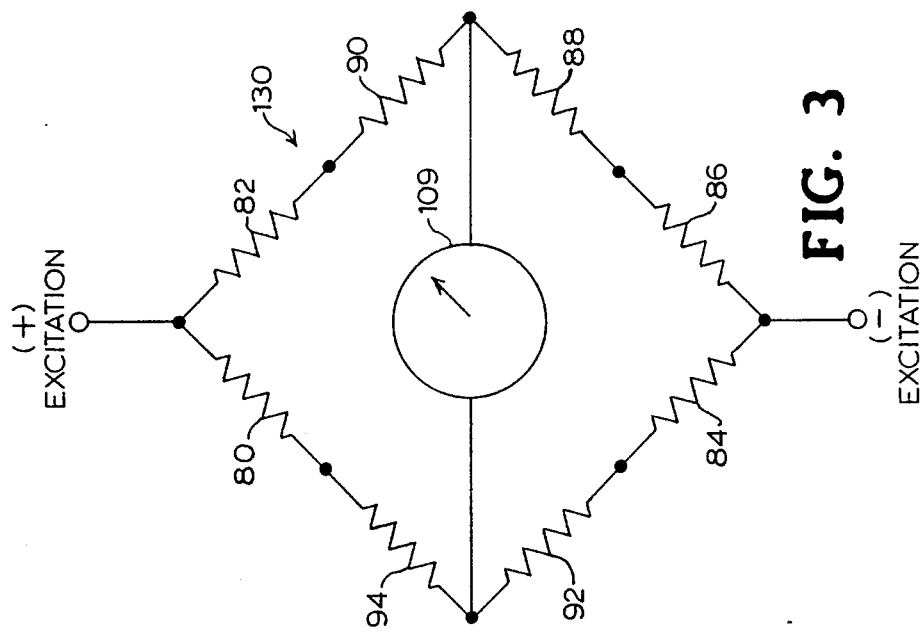
FIG. 3 is a schematic view of eight strain gauges connected in a Wheatstone Bridge configuration according to a second embodiment of the invention.

In an alternative embodiment illustrated only in reference to FIG. 3, strain gauges 80, 82 mount on the front surface 75 of central portion 34 above lower portion 27. Strain gauges 84, 86 are mounted at respective complimentary positions on the rear surface 77 of central portion 34 above lower portion 27. Strain gauge 88 is mounted on the front surface 75 of central portion 34 above the left half of element 42 as viewed in FIG. 12 and strain gauge 90 is mounted at a complimentary position on the rear surface 77 of central portion 34. Strain gauge 92 is mounted on the front surface 75 of central portion 34 above the right half of element 42 as viewed in FIG. 12 and strain gauge 94 is mounted in a complimentary position on the rear surface 77 of central portion 34. The gauges in this second embodiment configuration are connected in the bridge arrangement 130 as in FIG. 3. From the explanation above based on the configuration of FIG. 2 and with the background afforded by the description in prior U.S. Pat. No. 4,823,597, the operation of the FIG. 3 configuration will be readily understood.

The vibration compensating means 42 in whatever form is preferably constructed with respect to mass and stiffness so as to have essentially the same resonance frequency as that of the lower portion 27 and thereby provide substantially equal response to external vibration imposed on base 22. In a preferred form vibration compensating element 42 essentially surrounds the lower portion 27 and has a resonance frequency substantially equal to that of lower portion 27.

It will be seen that the advantages of the strain gauge and vibration compensating element arrangement provided by the system of U.S. Pat. No. 4,823,597 has been preserved in the present invention and thus provides a measurement wherein deflection sensings produced by external vibrations have been eliminated from the reading. However, of particular significance to the present invention there is now also provided a system which automatically responds to overload and thus minimizes opportunity for damage to the gauge plate.

Although the present invention has been described with reference to preferred embodiments, workers skilled in the art will recognize that changes may be made in form and detail without departing from the spirit and scope of the invention.

What is claimed is:

1. An apparatus for measuring the unit weight of sliver as it passes through a trumpet, comprising:
   (a) an integral plate member having a first end portion, a second end portion having a central opening for mounting a trumpet and a central portion of reduced cross-section joining said first and second end portions;
   (b) a trumpet for passing sliver, said trumpet being mounted in said second end portion and operative to deflect said central portion when sliver is passed therethrough;
   (c) means for supporting said plate member first end portion to maintain said trumpet in a first position in the absence of an overload on the trumpet and in response to an overload on the trumpet to allow said trumpet to move to a second position to avoid excess strain on said plate central portion and after said overload has passed to permit said trumpet to move back to its first position; and
   (d) detection and signaling means operative when sliver is passed through said trumpet in the absence of an overload on the trumpet and during vibration of said base to detect deflection in said central portion imposed by passing of sliver through said trumpet and by vibration of said lower portion and to develop therefrom a measuring voltage substantially indicative of the deflection imposed on said trumpet in the absence of said vibration as an indication of said unit weight.

2. An apparatus for measuring the unit weight of sliver passed through a trumpet as claimed in claim 1 wherein:
   (a) said detection and signalling means comprises:
      (i) individual electrically resistive type strain gauges secured to said central portion at selected positions and operative to detect said deflections and generate changes in resistance in response thereto; and
      (ii) circuit means connecting said strain gauges in a Wheatstone Bridge configuration in a manner such that the resistance changes attributable to detecting said vibrations tend to cancel out and said measuring voltage is obtained across a selected pair of nodes of said Wheatstone Bridge to indicate said unit weight.

3. An apparatus for measuring the unit weight of sliver passed through a trumpet as claimed in claim 1 wherein said means for supporting said plate means first end portion comprises spring loaded support means operative to allow said trumpet to move to said second position against spring pressure and after passing of said overload to force said trumpet back to said first position under spring pressure.

4. An apparatus for measuring the unit weight of sliver passed through a trumpet as claimed in claim 1 including vibration compensating structure separately joined to said central portion and adapted to vibrate independent of said second end portion;

5. An apparatus for measuring the unit weight of sliver passed through a trumpet as claimed in claim 3 wherein said vibration compensating structure is formed so as to be substantially equivalent in weight to the weight of said second end portion.

6. An apparatus for measuring the unit weight of sliver passed through a trumpet as claimed in claim 4 wherein an outer portion of said second end portion is annular in form and said vibration compensating structure is formed as an integral member surrounding said second end portion including its outer annular portion.

7. An apparatus for measuring the unit weight of sliver passed through a trumpet as claimed in claim 1 wherein said plate member is vertically positioned.

8. An apparatus for measuring the unit weight of sliver as it passes through a trumpet, comprising:
   (a) an integral plate member having a first end portion, a second end portion having a central opening for mounting a trumpet and a central portion of reduced cross-section joining said first and second end portions;
   (b) a trumpet for passing sliver, said trumpet being mounted in said second end portion and operative to deflect said central portion when sliver is passed therethrough;
   (c) means secured to a base operative to support said plate member to maintain said trumpet in a first position in the absence of an overload on the trumpet and in response to an overload on the trumpet to allow said trumpet to move to a second position to avoid excess strain on said plate central portion and after said overload is removed to restore said trumpet to its first position; and (d) detection and signalling means operative when sliver is passed through said trumpet and during vibration of said base to detect deflection in said central portion imposed by passing of sliver through said trumpet and to develop therefrom a measuring voltage substantially indicative of the deflection imposed on said trumpet in the absence of said vibration as an indication of said unit weight.

9. An apparatus for measuring the unit weight of sliver as it passes through a trumpet as claimed in claim 8 wherein said plate member is vertically positioned.

10. An apparatus for measuring the unit weight of sliver as it passes through a trumpet as claimed in claim 8 including vibration compensating means joined to said central portion and adapted to vibrate independent of said second end portion, said vibration compensating means having a mass and stiffness providing a resonance frequency substantially equal to that of said second end portion;

11. An apparatus for measuring the unit weight of sliver as it passes through a trumpet as claimed in claim 10 wherein an outer portion of said second end portion is annular in form and said vibration compensating structure is formed as an integral member surrounding said second end portion including its outer annular portion.

* * * * *